Feb. 13, 1951 R. L. HUBBARD 2,541,063
PRUNING TOOL
Filed Dec. 15, 1947 2 Sheets-Sheet 2
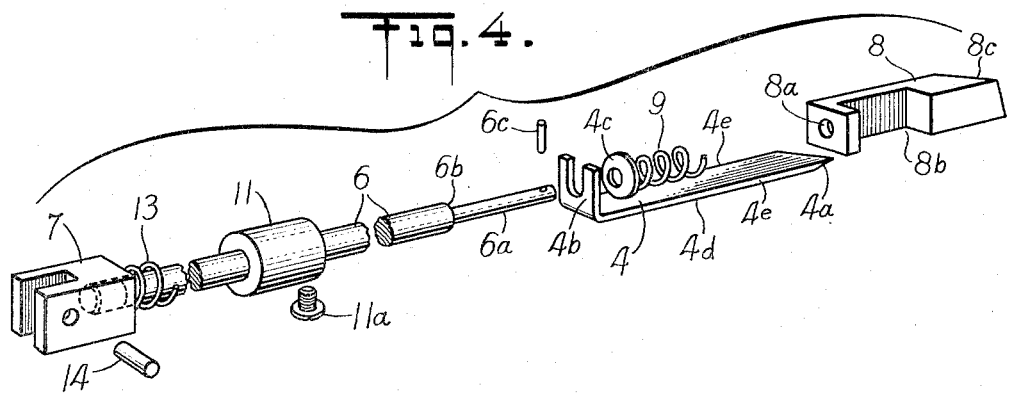
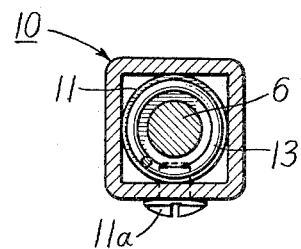
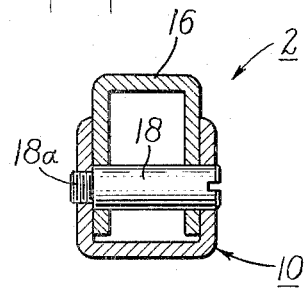
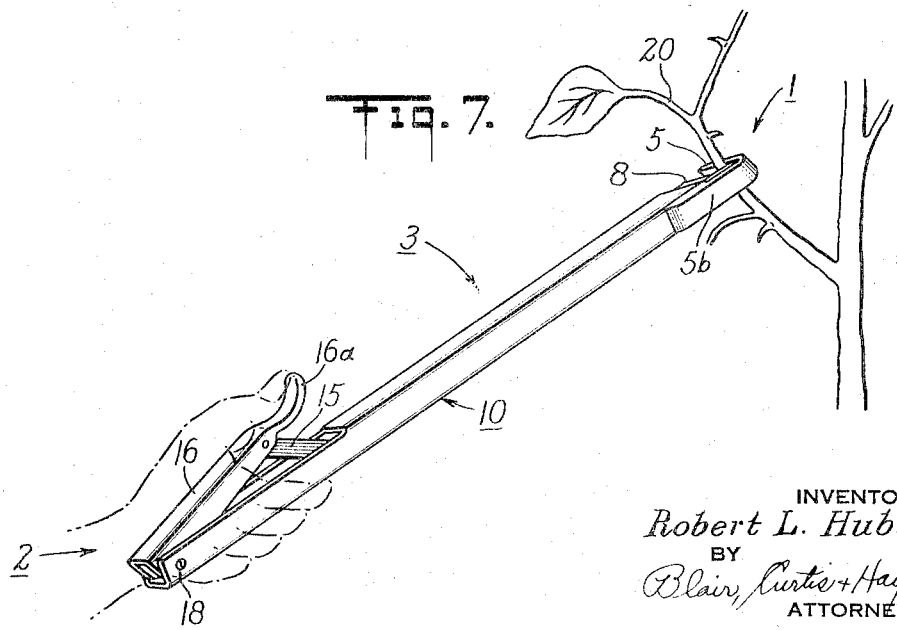
INVENTOR
Robert L. Hubbard
BY
Blair, Curtis + Hayward
ATTORNEYS Patented Feb. 13, 1951

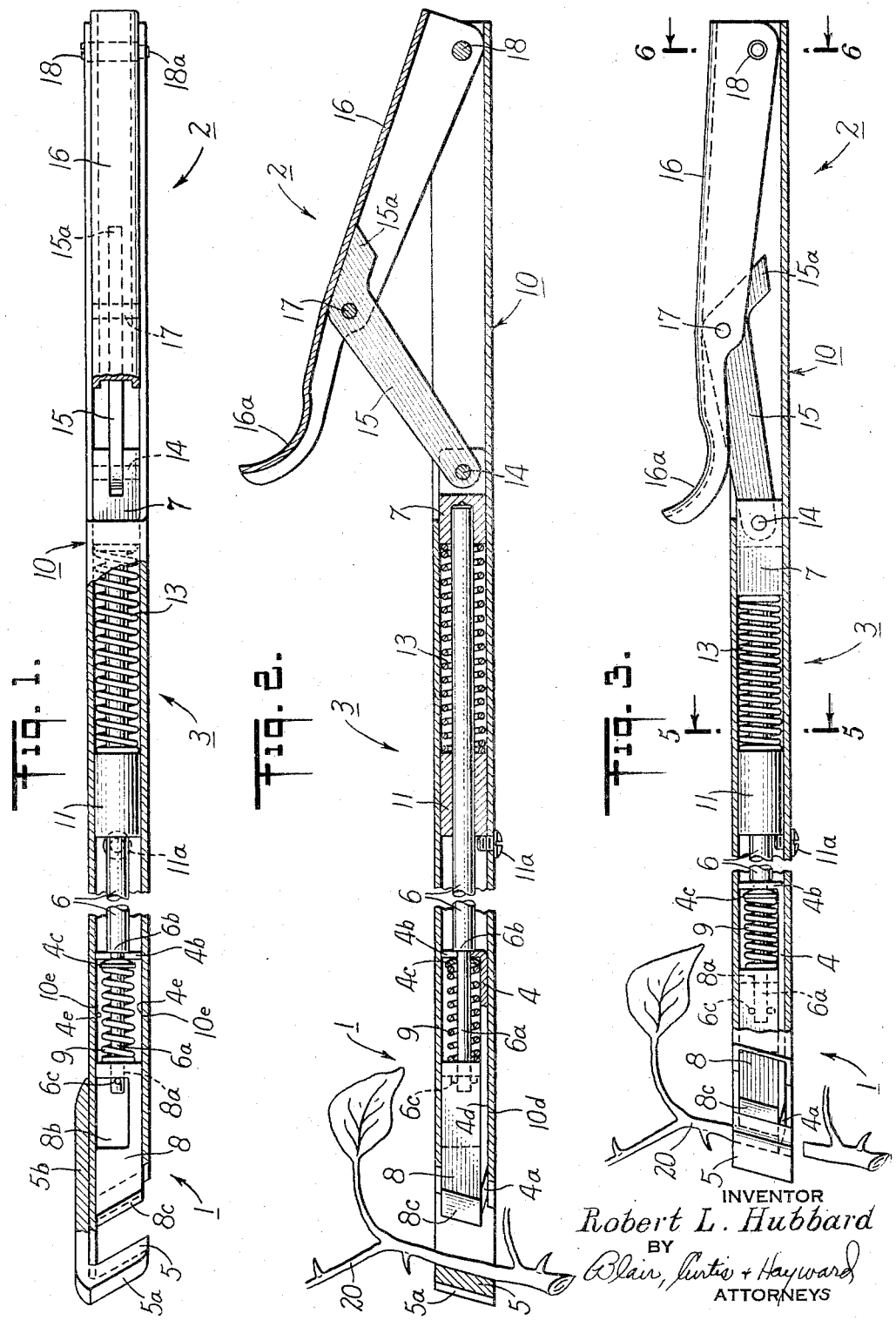

2,541,063

UNITED STATES PATENT OFFICE 2,541,063

PRUNING TOOL

Robert L. Hubbard, Florham Park, N. J.

Application December 15, 1947, Serial No. 791,890

2 Claims. (Cl. 30—124)

The present invention relates to cutting tools particularly useful for cutting flowers in the garden or greenhouse, for de-tasseling corn and for pruning shrubs and small branches of trees.

One of the objects of the invention is to provide a cutting tool with which the user without stretching or bending may reach up, or down, or through a plant, to cut a stem and at the same time hold the stem after it has been cut to retrieve the stem.

Another object is to provide a tool which serves to cut and hold the cut stem and which has no parts to catch on intervening stems while manipulating the tool to the stem to be cut.

Another object is to provide such a tool having a minimum of parts, readily assembled and disassembled, and having a readily replaceable knife blade.

Another object is to provide a tool that is inexpensive and is adapted to mass production.

Other objects will be in part obvious and in part pointed out hereinafter.

Referring to the drawings:

Figure 1 shows partly in section and partly in top plan, a cutting tool embodying the present invention;

Figure 2 shows in a vertical section the tool of Figure 1;

Figure 3 shows partly in vertical section the tool of Figure 1 after it has cut a stem and while it is holding the severed stem;

Figure 4 is an exploded view of interior parts of the cutting tool of Figure 1;

Figure 5 is a section taken through line 5—5 of Figure 3;

Figure 6 is a section taken through line 6—6 of Figure 3; and

Figure 7 is a view demonstrating how the tool may be hooked over a small branch prior to cutting it.

A cutting tool useful for cutting roses, or closely planted flowers in a garden, or for pruning parts of a shrub difficult to reach, should enable the user to reach through the stems or branches to the stem that he wishes to cut without catching on intervening stems. So also, the tool should be sufficiently long to enable the user to reach through a rosebush without his hands touching its briars. The tool should enable the user to reach down without stooping, and to reach overhead without a ladder (as in greenhouses) to cut the desired stem. And finally, the tool should enable the user to reach in to cut the stem and then bring out the flower without using his other hand; i. e., the tool should cut and hold the cut stem so that the stem may be lifted out by the tool.

It is another object of the present invention to provide a pruning and cutting tool which has the above mentioned advantages.

Referring to the drawings, and particularly to Figures 1 and 2, the cutting tool chosen to illustrate the present invention, comprises an elongated hollow frame generally indicated at 10. Its square cross-section is shown in Figure 5. Frame 10 has a cutting end, generally indicated at 1, a handle end, generally indicated at 2, and a connecting shank portion, generally indicated at 3.

Mounted for reciprocation in cutting end 1 is a knife blade 4 (see also Fig. 4) having a slanting cutting edge 4a, and an operating shoulder portion 4b cut out to provide a yoke. The yoke, as shown in Figures 1 and 2, straddles a reduced end 6a of an operating rod 6 inside casing 10. Shoulder 4b is held between a cupped washer 4c and a shoulder 6b, at the junction between operating rod 6 and its reduced end 6a.

Reciprocation of rod 6 moves knife blade 4. Rod 6 extends the length of frame 10 and is reciprocated by a handle 16 mounted on the handle end 2. The mechanism for moving rod 6 by handle 16 includes a sliding toggle block 7 (Figure 4) slidably mounted in frame 10 and fixed to the right end of rod 6 as shown in Figure 2. Coil spring 13 around rod 6, pushes against toggle block 7 and against a sleeve 11, carried by rod 6. Leftward movement of sleeve 6 is limited by a stop screw 11a, suitably threaded through frame 10. Spring 13, reacting against sleeve 11 normally urges toggle block 7 rightward, and so urges operating rod 6 and knife blade 4 rightward, into position to receive a stem for cutting.

Toggle block 7, operating rod 6 and knife blade 4 are movable leftward against the action of spring 13, toward cutting position, by a toggle link mechanism comprising lever 15, suitably pivotally connected to toggle block 7 by a pin 14, and to handle 16 by a pin 17. Handle 16 is pivoted on the end of frame 10, by a removable pin 18 threaded at 18a into the side of frame 10.

When thumb piece 16a of handle 16 is depressed, toggle link 15 forces toggle block 7 leftward, forcing rod 6 and knife blade 4 leftward and moving knife edge 4a into cutting position as shown in Figure 3.

Release of pressure on thumb piece 16a permits spring 13 to return the parts to the position shown in Figure 2. An extension 15a of lever 15 contacts the underside of handle 16 and limits the amount of the return motion, properly to position knife blade 4 for its next cutting operation.

The direct mechanical connection between handle 16 and knife blade 4, plus the mechanical advantage obtained by the action of the toggle link construction, imparts sufficient force to the knife blade to cut through thick stems with a minimum of pressure applied to the thumb piece 16a. Toggle block 7 is shaped to slide freely in and be guided by square frame 10, so that practically no force is absorbed in pushing toggle block 7.

Knife blade 4 operates against a hook shaped anvil 5 extending from the cutting end 1 of frame 10. When handle 16 is completely depressed, edge 4a of knife blade 4 abuts anvil 5 so that a stem 20 (Figure 3) held between anvil 5 and knife blade 4 is severed as the knife blade is pushed forwardly into contact with the anvil.

Anvil 5 is shaped to form a hook so that it may be hooked over a stem to be cut, thereby to securely grasp the stem prior to cutting. The cutting edge 4a of knife blade 4 is slanted to accommodate the slant of anvil 5.

Also the outside surface 5a of anvil 5 is slanted to enable the tool to be pushed through branches or stems of a bush to reach the stems to be cut; the slanting surface 5a serving to guide the tool past interfering branches or stems.

Knife blade 4 is guided in its reciprocating movement by contact with inside surfaces of frame 10. The outer main surface 4d of knife blade 4 is guided by opposing inside surface 10d of the frame 10. Opposite edges 4e (Figures 1 and 4) of knife blade 4 are guided by opposing inside surfaces 10e of frame 10. In addition, a holding slide block 8 (to be hereinafter described) keeps the knife blade in place against surface 10d. Thus as knife blade 4 is reciprocated toward and away from anvil 5, its knife edge 4a is at all times securely guided.

To hold the stem 20 while it is being cut, and after it has been cut, holding slide block 8 is provided. Referring to Figures 1 and 4, block 8 is shaped to slide in frame 10 beside knife blade 4, and is reciprocated with the knife blade by rod 6 to hold the stem against the anvil during and after cutting. To this end block 8 is mechanically connected to rod 6 by a resilient overthrow connection as follows: Reduced end 6a passes through a hole in a boss 8a and into an opening 8b in the block. The coil spring 9 forces the boss against a stop pin 6c in the reduced end and normally holds the block so positioned. The other end of spring 9 pushes against washer 4c, operating shoulder 4b and shoulder 6b to hold knife blade 4 in place against shoulder 6b.

The front end 8c of block 8 is slanted to conform to the slant of anvil 5, for as rod 6 advances, spring 9 causes block 8 to advance toward anvil 5 and if no stem is between the block and anvil, the former moves into contact with the anvil. But if a stem is between the two (as in Figure 3) block 8 contacts stem 20 before knife blade 4 contacts the stem, and the stem stops further forward movement of block 8. But compressed spring 9 holds block 8 against the stem, to hold the stem tightly between the block and anvil. The space 8b in block 8 permits the operating rod 6 to continue the forward movement to force knife edge 4 to cut through the stem after holding block is stopped by the stem.

Stem 20 thus held may be withdrawn from the bush from which it was cut and placed in a basket without being touched by hand. By merely releasing handle 16, spring 13 releases stem 20 and returns the parts to their retracted positions and conditions knife blade 4 and anvil 5 to receive a fresh stem to be cut.

Spring 9 which serves to force block 8 toward anvil 5 need be only strong enough firmly to hold the stem, it need not be so strong as to crush the stem or otherwise damage it.

The tool as shown in the drawing is simple to manufacture and may be made sufficiently rugged that it can cut any stem or branch that can be placed between anvil 5 and block 8. Anvil 5 is preferably formed from a strong metal and is part of a piece 5b which is welded, riveted or otherwise securely fastened to the end of case 10.

The assembled tool as shown in Figures 1, 2 and 3 is readily disassembled by the simple expedient of threading stop screw 11a out to release sleeve 11 which action releases spring 13. Then, by threading screw 18 out of the case and pulling it from handle 16, the entire assembly, within the frame, may be withdrawn as a unit. In the withdrawn position, knife blade 4 may be replaced by slipping yoke 4b from between reduced end 6a and washer 4c and sliding in a new knife blade.

The tool is readily assembled by merely sliding block 8 and blade 4 assembled on operating rod 6 into frame 10 past the position of stop screw 11a. Then stop screw 11a is threaded into position to stop sleeve 11, and the toggle block 7 is pushed forwardly into frame 10 against the action of spring 13 to bring handle 16 into proper position for pin 18 to be passed through the frame 10 through the handle 16 and threaded into the frame as shown at 18a in Figure 1.

It will be seen that the foregoing tool has the advantages heretofore mentioned.

As many possible embodiments of the present invention may be made without departing from the scope thereof, it is to be understood that all matter set forth in this specification or shown in the accompanying drawings is to be interpreted as illustrative only and not in a limiting sense.

I claim:

1. A pruning tool comprising an elongated hollow frame rectangular in cross section, an operating handle pivoted at one end of the frame, an anvil in the form of a hook secured to the other end of said frame and having a width approximating that of the frame and lying within the geometric projection of said frame, a holding block rectangular in cross section and slidably mounted within said frame and having a holding face adapted to abut said anvil, a knife blade slidably mounted with respect to said holding block and frame and between the holding block and frame and having a knife edge adapted to abut said anvil, a toggle block slidably mounted in said frame, a link connecting said handle and toggle block and forming therewith a toggle link, said link being receivable within said frame, a connecting rod secured to said toggle block and extending through said frame and into a recess in said holding block, a lost-motion connection between the connecting rod and holding block, a shoulder on said connecting rod, a yoke-like projection extending from said knife blade and receiving said connecting rod, a spring normally holding the yoke-like projection against said shoulder and urging said holding block forwardly against the lost-motion connection with said connecting rod, whereby as said rod is moved forwardly said spring moves said holding block against said anvil, and said shoulder moves said knife against said anvil.

2. A pruning tool comprising an elongated hollow frame rectangular in cross section, an operating handle pivoted at one end of the frame, an anvil in the form of a hook secured to the other end of said frame and having a width approximating that of the frame and lying within the geometric projection of said frame, a holding block rectangular in cross section and slidably mounted within said frame and having a holding face adapted to abut said anvil, a knife blade slidably mounted with respect to said holding block and frame and between the holding block and frame and having a knife edge adapted to abut said anvil, a toggle block slidably mounted in said frame, a link connecting said handle and toggle block and forming therewith a toggle link, said link being receivably within said frame, a connecting rod secured to said toggle block and extending through said frame and into a recess in said holding block, a lost-motion connection between the connecting rod and holding block, a shoulder on said connecting rod, a yoke-like projection extending from said knife blade and receiving said connecting rod, a spring normally holding the yoke-like projection against said shoulder and urging said holding block forwardly against the lost-motion connection with said connecting rod, whereby as said rod is moved forwardly said spring moves said holding block against said anvil, and said shoulder moves said knife against said anvil, and a stop around said connecting rod, a screw in said frame for holding said stop, and a spring around said connecting rod pushing against said stop and against said toggle block, thereby to hold the connecting rod, holding block, and knife normally in retracted position.

ROBERT L. HUBBARD.

REFERENCES CITED

The following references are of record in the file of this patent:

UNITED STATES PATENTS

| Number | Name | Date |
| --- | --- | --- |
| 460,903 | Woodward | Oct. 6, 1891 |
| 578,249 | Letteer | Mar. 2, 1897 |
| 775,649 | Gregory | Nov. 22, 1904 |
| 2,270,495 | Bernay | Jan. 20, 1942 |